United States Patent [19]

Forster

[11] Patent Number: 4,474,622

[45] Date of Patent: Oct. 2, 1984

[54] COMPOSITION AND PROCESS FOR RECOVERING AND UPGRADING PETROLEUM PRODUCTS

[75] Inventor: Marc-André Forster, La Celle Saint Cloud, France

[73] Assignee: Establissements Somalor-Ferrari Somafer S.A., Uckange, France

[21] Appl. No.: 414,344

[22] PCT Filed: Dec. 23, 1981

[86] PCT No.: PCT/FR81/00168
§ 371 Date: Aug. 16, 1982
§ 102(e) Date: Aug. 16, 1982

[87] PCT Pub. No.: WO82/02177
PCT Pub. Date: Jul. 8, 1982

[30] Foreign Application Priority Data

Dec. 23, 1980 [FR] France .................. 80 27831

[51] Int. Cl.$^3$ .................. B08B 9/08; C11D 3/26; C11D 3/30; C11D 3/34
[52] U.S. Cl. .................. 134/10; 134/22.18; 134/22.19; 134/40; 252/153; 252/545; 252/548; 252/8.55 B
[58] Field of Search .............. 252/357, 358, 153, 528, 252/529, 545, 547, 548, 8.55 B; 134/22.12, 134/22.18, 22.14, 22.19, 40, 10

[56] References Cited

U.S. PATENT DOCUMENTS

| | | | |
|---|---|---|---|
| 3,077,929 | 2/1963 | Fetkovich et al. | 134/22.14 |
| 3,102,100 | 8/1963 | Greenwald | 252/8.55 B |
| 3,154,489 | 10/1964 | DuBrow et al. | 252/547 |
| 3,436,263 | 4/1969 | Strenkert et al. | 134/22.19 |
| 3,497,365 | 2/1970 | Atherton et al. | 252/153 |
| 3,535,160 | 10/1970 | Arger | 134/22.19 |
| 3,718,586 | 2/1973 | Rollo et al. | 252/8.55 B |
| 3,998,743 | 12/1976 | Maly et al. | 252/8.55 B |
| 4,264,479 | 4/1981 | Flanagan | 252/529 |

FOREIGN PATENT DOCUMENTS

| | | |
|---|---|---|
| 2211546 | 7/1974 | France . |
| 53600 | 3/1982 | Japan .................. 252/547 |

OTHER PUBLICATIONS

Chemical Abstracts "Mobilizing Petroleum Sludges" 9700x, vol. 95 (2), 1981, p. 148.
"McCutcheon's Detergent and Emulsifiers" 1978 Annual North American Edition pp. 127–128.

Primary Examiner—S. Leon Bashore
Assistant Examiner—K. M. Hastings
Attorney, Agent, or Firm—Dennison, Meserole, Pollack & Scheiner

[57] ABSTRACT

A composition for recovering and upgrading sludge that accumulates in vessels for storing and transporting petroleum products comprises a solvent made up of at least one aliphatic hydrocarbon and at least one aromatic monohalogenated hydrocarbon of the benzene or naphthalene type, together with a demulsifying and dispersing agent that is an aliphatic straight-chain oxyethylated amineated derivative or a quaternary ammonium compound having at least one alkyl and at least one aryl residue in the form of thiocyano derivative.

The composition is dissolved in a hydrocarbon in a proportion of from 2 to 10% by weight, the resulting solution is projected on to the residues at a pressure of from 2 to 15 bars, and the resulting suspension is recycled, recovered, and treated like crude oil.

The invention is applied to the recovery and upgrading of sludges which accumulate in storage vessels and petroleum product transport vessels, whether they are on the ground or on land or sea transport vessels.

9 Claims, No Drawings

COMPOSITION AND PROCESS FOR RECOVERING AND UPGRADING PETROLEUM PRODUCTS

The invention relates to a composition and a process for the recovery and upgrading of the sludges that accumulate in vessels for storing and transporting petroleum products. It can also be applied to pockets of hydrocarbons that are to be made exploitable.

It is known that sludges of high and low viscosity comprising heavy hydrocarbon derivatives, or an emulsion of these with water, accumulate in the course of time in vessels for storing or transporting petroleum products such as crude oil light or heavy fuel oil or slop, and that it is difficult to eliminate such sludges by pumping or other mechanical means.

The result of this is a substantial loss of useful raw material, a progressive reduction in the capacity of the vessels, and a correlated increase in the costs of storage and transportation of petroleum products, as well as the necessity either of periodically carrying out a particular treatment of the vessels to remove such residues or of abandoning the use of the vessels.

In addition, it is known that there are difficulties of emptying or exploiting certain vessels or containers or pockets because of the high viscosity of the products they contain. Conventionally, the recovery operation is performed by inundating the mass of sludge with hot water and hot hydrocarbons so as to dissolve or soften them or put them into suspension. The resulting reduction in the viscosity of the sludge then makes it possible for the sludge to be pumped and transferred.

This process is slow, as the capacity of the hydrocarbons for dissolving the fairly compact mass of sludge is relatively low, and this puts the vessels out of action for a prolonged period of time and also gives rise to high expenditure of heat and labor.

In addition, such a process cannot be applied to the whole of the mass of heavy hydrocarbons because, from a certain level of the mass, cavitation occurs at the intake of the emptying pumps, and this results in explosive gases being given off in the empty space in the vessel or pocket, which may explode upon contact with one single spark.

Therefore, the emptying of the vessel must be completed manually, and water is usually added to put the sludge into suspension so that it can be handled by means of scrapers and thus pushed toward suction intake hoses so that the sludge can fill portable containers.

This operation is carried out under very poor conditions of operator hygiene and safety, and this results in a very inefficient operation and also causes the containers to be out of action for a prolonged period.

In addition, the use of water results in the production of emulsions which in most cases cannot be recovered at the refining stage and which can be eliminated only by incineration, unless the operators of the process are prepared to tolerate the disadvantages of putting such substances into other containers, which results in a drop in the value of such products.

The present invention results from research into ways of overcoming the difficulties involved in the problem of recovering sludges and the economic importance of upgrading them by improving the working conditions involved and avoiding the loss of high-quality raw material and needless consumption of energy, which lead to the present invention, based on the discovery of a composition and a process that facilitates operation under substantially improved conditions of hygiene and safety, that uses a minimum amount of energy, substantially reduces the time for which manual intervention is required, and upgrades the sludges so that there is no need to waste the energy they contain or to clutter up other storage facilities with them.

The composition used in accordance with the present invention is produced by means of a solvent and a demulsifying and dispersing agent, characterized in that the solvent is a mixture containing at least one aliphatic hydrocarbon, with from 8 to 12 carbon atoms in the molecule, and at least one aromatic hydrocarbon of the benzene or naphthalene type, and the demulsifying and dispersing agent that is an aliphatic straight chain oxyethylated monoamine or diamine containing from 3 to 9 oxyethylated groups in which the chain is saturated or monoethylenically unsaturated and contains from 12 to 18 carbon atoms, or a quaternary ammonium compound having at least one alkyl and at least one aryl residue attached to the nitrogen atom and in the form of a base or a halogenated or thiocyano derivative.

Thus the composition is produced by means of a solvent and a demulsifying and dispersing agent and is characterized by the selection of its components. These components have a high level of dissolution capability with respect to the sludges, which in most cases comprise heavy hydrocarbons, and they also have the property of breaking the emulsions that may be produced between the fatty products and the water and that are the cause of the high viscosity of the sludges; this is in order to make the resulting suspension less viscous. In addition, they have the property of encasing the particles of hydrocarbons and the solid particles and acting as dispersants, that is to say, permitting the solid particles in suspension in the dissolution product not to agglutinate.

The optimum situation in regard to those qualities was achieved by the combined use, as the solvent, of, on the one hand, at least one $C_{8-12}$ aliphatic hydrocarbon, i.e., a substance whose boiling temperature under normal atmospheric pressure is from 130° to 190° C. The selection of $C_{8-12}$ alipahtic hydrocarbons is to limit the vapor pressure to a sufficiently low level, thereby avoiding the formation of explosive atmospheres in the vessels, without however using hydrocarbons with an excessive carbon content, which would result in the formation of solutions that it is more difficult to transport. Preferably, 40% of such substances comprise from 9 to 11 carbon atoms.

On the other hand, the solvent also includes at least one aromatic hydrocarbon of the benzene or naphthalene type. These substances are preferably used after substitution in their molecule of one or more hydrogen atoms with one or more atoms of halogenated elements. The halogenated aromatic compounds are preferably chlorinated, for reasons of economy. Thus, it is possible to use a mixture of orthodichlorobenzene and monochloronaphthalene in equal proportions by weight. All these aromatic hydrocarbons promote dissolution of the aromatic substances contained in the sludges, and the selection made between the various possible substances concerned is aimed at achieving the optimum solvent properties.

Usually, the solvent comprises, by weight, from ¼ to ⅓ of the aromatic hydrocarbons, and represents approximately 80 to 90% of the total mass of the composition. This mass also contains a demulsifying and dispersing agent from the group constituted of either -straight aliphatic chain oxyethylated monoamines and diamines in which the number of oxyethylated groups is between 3 and 9 and in which the chain is saturated or monoethylenated and has between 12 and 18 carbon atoms, or -quaternary ammonium basic compounds of the arylalkyl type or halogenated or thiocyano derivative.

The demulsifying and dispersing agent included in the composition, when an oxyethylated amine, is preferably one or more propyldiamines having the following formula:

$$NH_2-CH_2-CH_2-CH_2-NH_2$$

in which oxyethylated groups $-CH_2-CH_2-O-$ in $n,n',n''$ numbers and an aliphatic chain R have been grafted to give a product having the following general formula:

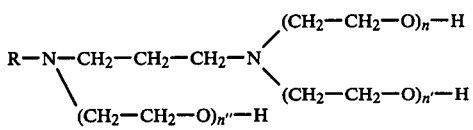

In the present case, n, n', and n" are integers totalling from 3 to 9 and R is a $C_{12\text{-}18}$ radical of formula:

$$CH_3-(CH_2)_x- \text{ or } CH_3-CH=CH-(CH_2)_{x-2}$$

where x is an integer from 11 to 17.

Preferably, use is made of a mixture of amines in which: $n+n'+n\Delta=7$ and in which R, if saturated, may comprise 14, 16 or 18 carbon atoms and if unsaturated comprises 18 carbon atoms. More precisely, that agent may contain the following by weight:
- 5% of amines in which R has 14 carbon atoms and is saturated,
- 30% of amines in which R has 16 carbon atoms and is saturated,
- 45% of amines in which R has 18 carbon atoms and is saturated, and
- 20% of amines in which R has 18 carbon atoms and is unsaturated.

When the demulsifying and dispersing agent is a quaternary ammonium compound, a thiocyano derivative having the following general formula is preferably used:

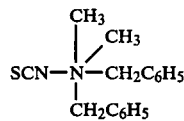

However, other efficient thiocyano derivatives are those in which one of the benzyl groups is replaced by an aliphatic straight chain comprising from 1 to 18 carbon atoms, the degree of efficiency improving in proportion to an increase in the number of carbon atoms, a derivative having a $C_{12\text{-}18}$ chain being highly suitable.

Besides its solvent, demulsifying and dispersing functions, the composition of the present invention also has the advantage of not having any harmful action on the catalysts used in the petroleum industry and therefore permitting the products subjected to their action to be upgraded or converted into useful products.

The present invention also provides a process for using the composition.

This process is characterized in that the composition is dissolved, in a proportion of from 2% to 10% by weight, in a hydrocarbon, the resulting solution is projected on to the sludges by means of a suitable apparatus at a rate of 20 m³/h to 150 m³/h and under a pressure in the range 2 to 15 bars, in an amount representing from 5 to 100% by weight of the mass of sludge to be treated; the solution which progressively becomes charged with the sludges, is recycled by means of pumps, and the resulting product is recovered by pumping for treatment by the normal cycle and the usual refining equipment.

The process thus consists of dissolving the described composition in a proportion of 2 to 10% by weight in a hydrocarbon, then spraying the solution thus obtained strongly against the mass of sludge to be liquefied.

If the contact between the sludge and the composition of the present invention is effected by simple mechanical agitation, the length of time required to liquefy the mass would be excessively long and economically unviable. It is for this reason that a large volume of the solution is preferably sprayed instantaneously under high pressure by means of one or more nozzles directed towards a number of points of the mass of sludge to be liquefied, at variable and adjustable angles of incidence. Rapid and effective results are assured by a flow of 20 to 150 m³/hour under a pressure of at least 2 bars and preferably at least 5 bars, and which can be for example 15 bars.

The sequence in which the projection of spraying is performed depends on the thickness of the sludges to be treated and the shape or size of the vessel in which they are contained. Thus, the projection of spraying equipment may be installed vertically or horizontally at various points, depending on the suction intake of the pump and/or possible openings in the vessel to be cleaned.

The physico-chemical action of the solution is generally sufficient at ambient temperature, but it can also be preheated to a temperature in the range 20° to 100° C. to accelerate the operation.

In all cases, in order to ensure safety of operation in regard to explosive gaseous phases and in order to guard against the consequences of electrical discharge, the chamber is maintained at a low pressure of an inert gas, e.g., nitrogen or carbon dioxide.

The volume of solution with respect to the volume of sludge to be removed may be from 5 to 100% and is preferably from 10 to 30%. It is adjusted dependent upon the nature and the consistency of the sludges. As the solution breaks up and liquefies the sludge, the solution is recycled by means of pumps, but the viscosity remains low, in all cases below 300 centistokes.

At the end of the operation, the product formed, which rests on a layer of water, which is formed by breakage of the emulsion with the petroleum products, is discharged and recovered by reintroducing it into a refining cycle.

The cleaning of the vessel can be completed by any suitable known substance and process As the recovered products are low in viscosity, stable and anhydrous, they can be stored in other vessels without the danger of gel formation or resettling, which would again give rise to sludge deposit problems.

The invention can be illustrated by means of the following examples of use:

EXAMPLE 1

2.5 tons of hydrocarbon sludge from a ship degassing station, which have remained in the open air for a number of years and which contain a large amount of water in the form of an emulsion, are treated in an open vessel. 0.6 tons of crude oil and 0.03 tons of a composition in accordance with the invention are added to the sludge, which is the consistency of butter. The constituents of the compositions are in the following proportions by weight:

63% of aliphatic hydrocarbons that distill at between 130° and 190° C. at atmospheric pressure
11.7% of monochloronaphthalene
13.3% of orthodichlorobenzene
12% of an alkylaryl ammonium sulphocyanate having the general formula

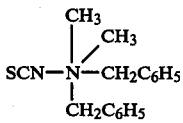

The liquid phase is set in circulation with the separate and simultaneous use of two centrifugal pumps, one of which is submerged. The pumps feed the liquid phase into the vessel by way of two fire nozzles which are directed towards the residues. The highest level of efficiency is given with a pressure of 5 bars and a flow rate of 40 m$^3$/h at each nozzle. The whole of the sludge mass is liquefied in three hours. A test involving pumping using a tank under vacuum is performed very easily. A sample of liquid, when stored for 6 months retains the same viscosity.

EXAMPLE 2

The process is applied in a refinery to a storage tank of floating roof type and 32 meters in diameter, containing 150 tons of crude oil sludge. The tank is maintained under a low nitrogen pressure.

Two movable cannons, which are fitted to the manholes of the tank, are supplied by a pump, and each sprays a flow rate of 65 m$^3$/h under a pressure of 10 bars.

A solution containing 40 tons of diesel oil and 1.5 tons of a composition in accordance with the invention is introduced into the tank. The proportions by weight of the composition are as follows:

60% of aliphatic hydrocarbons that distill at between 130° and 190° C. at atmospheric pressure
12.1% of monochloronaphthalene
13.9% of orthodichlorobenzene
14% of a mixture of oxyethylated propyldiamines of the formula given above in which $n+n'+n''=7$ and the aliphatic chains R are in the following proportions:
5% of amines in which R has 14 carbon atoms and is saturated,
30% of amines in which R has 16 carbon atoms and is saturated,
45% of amines in which R has 18 carbon atoms and is saturated, and
20% of amines in which R has 18 carbon atoms and is unsaturated.

After the solution has been circulated for 35 hours, the solidification temperature of the solution sprayed by the movable cannons at ambient temperature had altered from −30° C. to +9° C., indicating that the diesel oil was charged with paraffin products. That solution was entirely recovered. When the manholes of the tank were opened, there was no longer any trace of sludge.

EXAMPLE 3

The process according to the invention is applied to a storage tank of floating roof type with a diameter of 72 meters and containing 5800 m$^3$ of paraffined hydrocarbon sludge, at outside temperatures in the region of 0° C.

In order to reduce the nitrogen losses to the minimum, a careful seal is made of the joints of the roof, which makes it possible for a pressure of about 5 millibars in excess of atmospheric to be maintained, with a constant nitrogen flow rate of about 200 Nm$^3$ per day. The atmosphere is permanently monitored in order to ensure that there is no oxygen.

The equipment used comprises a centrifugal pump associated with a vacuum pump with a total power consumption of 250 CV and five movable cannons disposed at the openings of the manholes of the floating roof and at the openings in the casing, each of the cannons delivering 120 m$^3$/hour of solution at a pressure of 9 bars. That solution is formed by dissolving 105 tons of the following composition in 5200 tons of crude oil:

60% of aliphatic hydrocarbons
12.1% of monochloronaphthalene
13.9% of orthodichlorobenzene
14% of a mixture of oxyethylated propyldiamines of the formula given above in which $n+n'+n''=7$ and the aliphatic chains R in the following proportions:
5% of amines in which R has 14 carbon atoms and is saturated,
30% of amines in which R has 16 carbon atoms and is saturated,
45% of amines in which R has 18 carbon atoms and is saturated,
20% of amines in which R has 18 carbon atoms and is unsaturated.

The operation was carried out in 7 stages, each of 2 days, each stage comprising, on the first day, intensive recycling of the solution used in order to progressively dissolve the sludge and, on the second day, repumping of the liquefied sludge in the tank in order to pass it to refining equipment where the sludge was entirely upgraded.

The present invention is used in the liquefication and upgrading of sludges that accumulate in vessels for storing and transporting petroleum products, irrespective of whether such vessels are on the ground or on equipment for transporting such products by land or by sea.

The invention can also be used in natural pockets containing viscous hydrocarbons by applying known extraction processes.

I claim:

1. A composition for recovering and upgrading sludge that accumulates in vessels for storing and transporting petroleum products, comprising:
80 to 90% by weight of a solvent made up of ⅔ to ¾ by weight of at least one aliphatic hydrocarbon and ¼ to ⅓ by weight of at least one aromatic halogenated hydrocarbon of the benzene or napthalene type; and
10 to 20% by weight of a demulsifying and dispersing agent that is an aliphatic straight-chain oxyethylated amineated derivative or a quaternary ammonium compound, wherein this agent is selected from the group of:

A. propyldiamines onto which are grafted oxyethlated groups and an aliphatic chain R, to give a product of the formula:

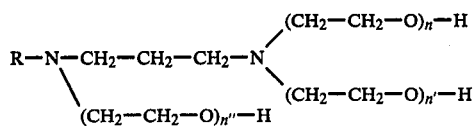

wherein n, n', and n" are integers totalling from 3 to 9, and

B. a thiocyano derivative of a quaternary ammonium basic compound, having the formula:

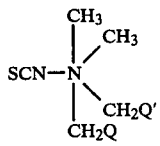

wherein (1) Q and Q' are both benzyl groups or (2) one of Q and Q' is a benzyl group and the other of Q and Q' is a saturated aliphatic group.

2. A composition according to claim 1, wherein said agent is said propyldiamine in which $n+n'+n''=7$.

3. A composition according to claim 1 wherein said agent is said propyldiamine in which R is a saturated straight chain aliphatic group containing from 12 to 18 carbon atoms.

4. A composition according to claim 1 wherein said agent is said propyldiamine in which R is a mononethylenically unsaturated straight chain aliphatic group containing from 12 to 18 carbon atoms.

5. A composition according to claim 1, wherein said agent is said quaternary ammonium compound in which Q and Q' are both benzyl groups.

6. A composition according to claim 1, wherein said agent is said quaternary ammonium compound in which one of Q and Q' is a benzyl group and the other of Q and Q' is a saturated aliphatic group.

7. A composition according to claim 6, wherein the saturated aliphatic group comprises from 1 to 18 carbon atoms.

8. A method of using a composition according to claim 1, comprising dissolving the composition, in a proportion of from 2 to 10% by weight, in a hydrocarbon; projecting the resulting solution onto the sludge at a rate of 20 m³/hour to 150 m³/hour at a pressure of from 2 to 15 bars in an amount representing from 5 to 100% by weight of the weight of the sludge to be treated; recycling the solution, as it progressively becomes charged with the sludge, by means of pumps, pumping off the resulting product and refining the petroleum sludge.

9. A method according to claim 8, in which the operation is under safety conditions including an inert and antiexplosive atmosphere.

* * * * *